United States Patent
Mugiraneza

(10) Patent No.: US 12,014,013 B2
(45) Date of Patent: Jun. 18, 2024

(54) DISPLAY DEVICE AND A METHOD OF MANUFACTURING THE SAME

(71) Applicant: SHARP KABUSHIKI KAISHA, Sakai (JP)

(72) Inventor: Jean Mugiraneza, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/921,631

(22) PCT Filed: Apr. 27, 2020

(86) PCT No.: PCT/JP2020/017944
§ 371 (c)(1),
(2) Date: Oct. 27, 2022

(87) PCT Pub. No.: WO2021/220334
PCT Pub. Date: Nov. 4, 2021

(65) Prior Publication Data
US 2023/0176699 A1     Jun. 8, 2023

(51) Int. Cl.
*G06F 3/044* (2006.01)
*G06F 3/047* (2006.01)

(52) U.S. Cl.
CPC ............ *G06F 3/0445* (2019.05); *G06F 3/047* (2013.01)

(58) Field of Classification Search
CPC ................................ G06F 3/0445; G06F 3/047
See application file for complete search history.

(56) References Cited

U.S. PATENT DOCUMENTS

| | | | | |
|---|---|---|---|---|
| 2014/0152921 A1* | 6/2014 | Yashiro | ................. | G06F 1/1692 349/12 |
| 2014/0160377 A1* | 6/2014 | Yamagishi | ............ | G06F 1/1643 349/12 |
| 2015/0049030 A1 | 2/2015 | Her | | |
| 2015/0219971 A1* | 8/2015 | Tanaka | .................. | G06F 3/0446 349/12 |
| 2018/0039360 A1 | 2/2018 | Akimoto et al. | | |
| 2018/0348904 A1 | 12/2018 | Noma | | |
| 2019/0294284 A1 | 9/2019 | Akimoto et al. | | |
| 2019/0369811 A1* | 12/2019 | Hsu | ........................ | G06F 3/0445 |

FOREIGN PATENT DOCUMENTS

| | | |
|---|---|---|
| JP | 2012022427 A | 2/2012 |
| JP | 2018022322 A | 2/2018 |
| WO | 2017043421 A1 | 3/2017 |

* cited by examiner

*Primary Examiner* — Kenneth B Lee, Jr.
(74) *Attorney, Agent, or Firm* — ScienBiziP, P.C.

(57) ABSTRACT

A display device according to an aspect includes: a display panel; and a touch panel on the display panel. The touch panel includes: a plurality of detection electrodes extending in a first direction in a plan view; and a plurality of drive electrodes disposed respectively between the plurality of detection electrodes and extending in the first direction. Each of the plurality of drive electrodes includes: a plurality of electrode segments patterned in the first direction; and a plurality of wires connected respectively to the plurality of electrode segments and extending in the first direction.

5 Claims, 17 Drawing Sheets

$$RC = RT \times (CT + Cm + Cpad) + RE \times (CE + Cm + Cpad) \quad \cdots (EQ. 1)$$

$$RC = RT^* \times (CT^* + Cm^* + Cpad) \quad \cdots (EQ. 2)$$

DISPLAY DEVICE AND A METHOD OF MANUFACTURING THE SAME

TECHNICAL FIELD

The disclosure relates to display devices including a touch panel on a display panel.

BACKGROUND ART

Display devices have been known that include a touch panel on a display panel including active matrix OLEDs (organic light-emitting diodes) (Patent Literature 1).

CITATION LIST

Patent Literature

Patent Literature 1: US Patent Application Publication No. 2015/0049030 (Published Feb. 19, 2015)

SUMMARY

Technical Problem

However, because the display device described in Patent Literature 1 detects a change in electrostatic capacity of a location where touch electrodes extending in the row direction and touch electrodes extending in the column direction cross in a plan view, the parasitic capacitance increases if the touch electrodes are located close to the anodes electrode of the OLEDs. Therefore, the time constant disadvantageously deteriorates so that the display device exhibits lower sensitivity to small changes of capacitance.

Solution to Problem

The disclosure, in one aspect thereof, is directed to a display device including: a display panel; and a touch panel on the display panel, the touch panel including: a plurality of detection electrodes extending in a first direction in a plan view; and a plurality of drive electrodes disposed respectively between the plurality of detection electrodes and extending in the first direction, each of the plurality of drive electrodes including: a plurality of electrode segments patterned in the first direction; and a plurality of wires connected respectively to the plurality of electrode segments and extending in the first direction.

Advantageous Effects of Disclosure

The disclosure in one aspect thereof, can provide a display device that, even if there is provided a touch panel on a display panel, prevents increases in parasitic capacitance and deterioration of the time constant and exhibits high sensitivity to changes in small capacitance.

DESCRIPTION OF EMBODIMENTS

Embodiment 1

Figure 1:
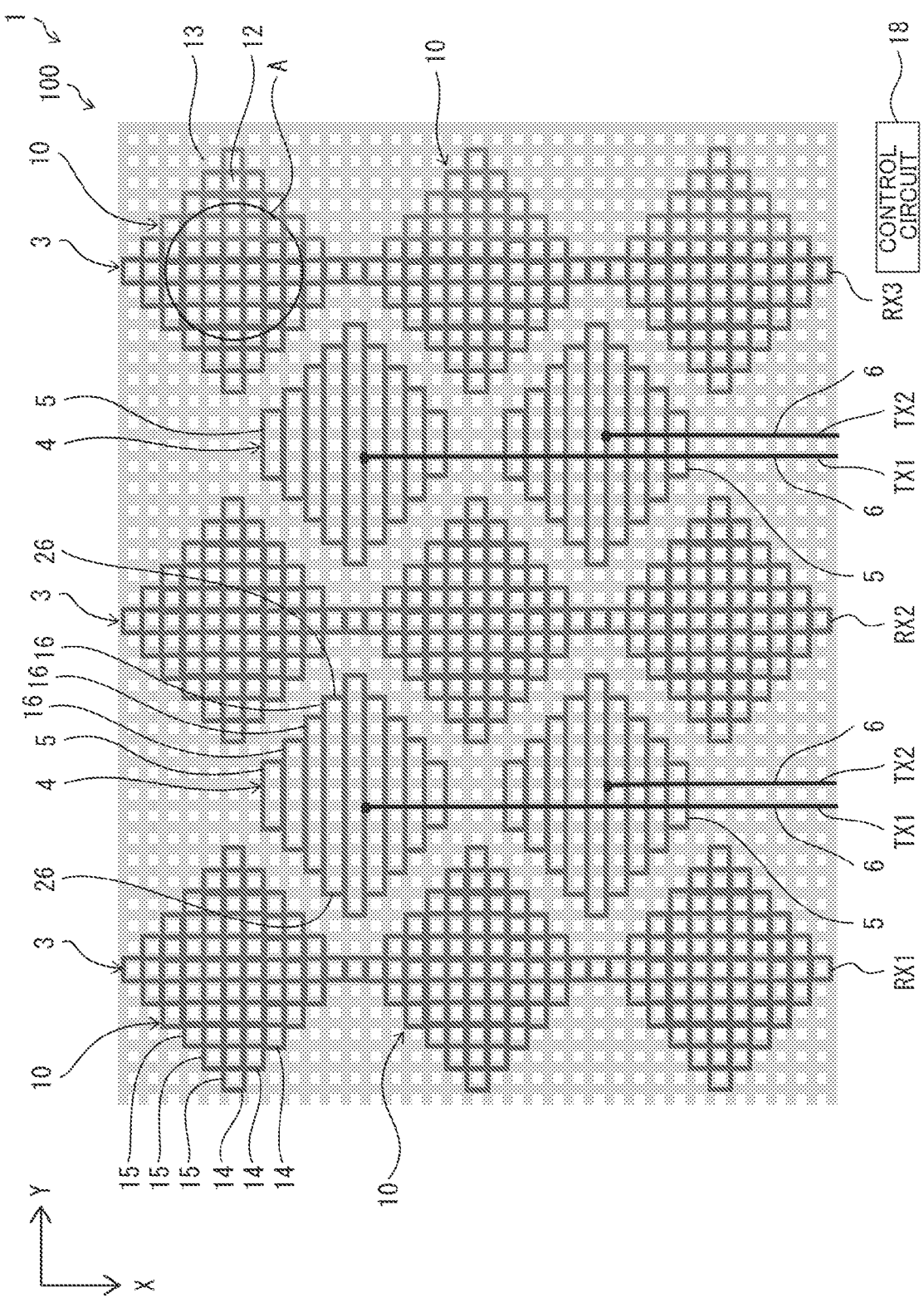
FIG. 1 is a plan view of a display device in accordance with Embodiment 1.
Figure 2:
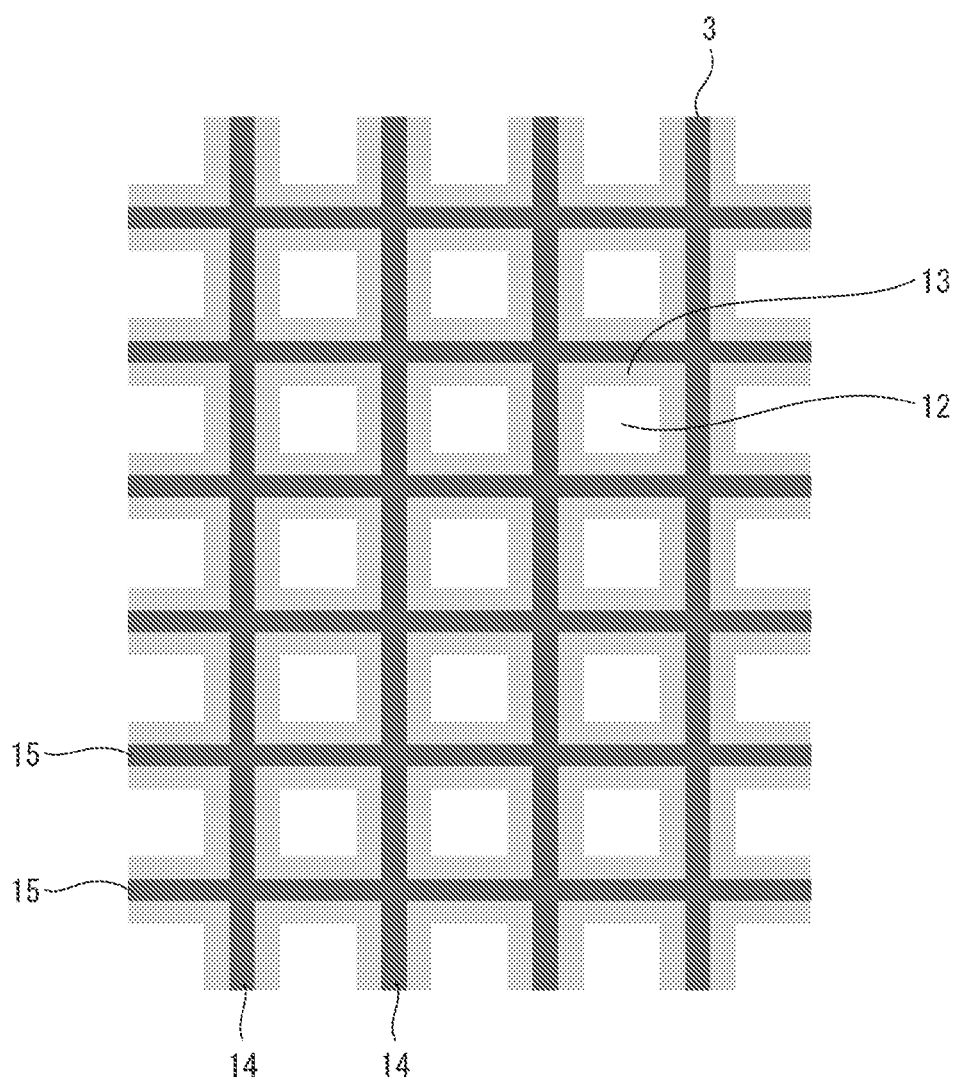
FIG. 2 is an enlarged view of portion A shown in FIG. 1.
Figure 3:
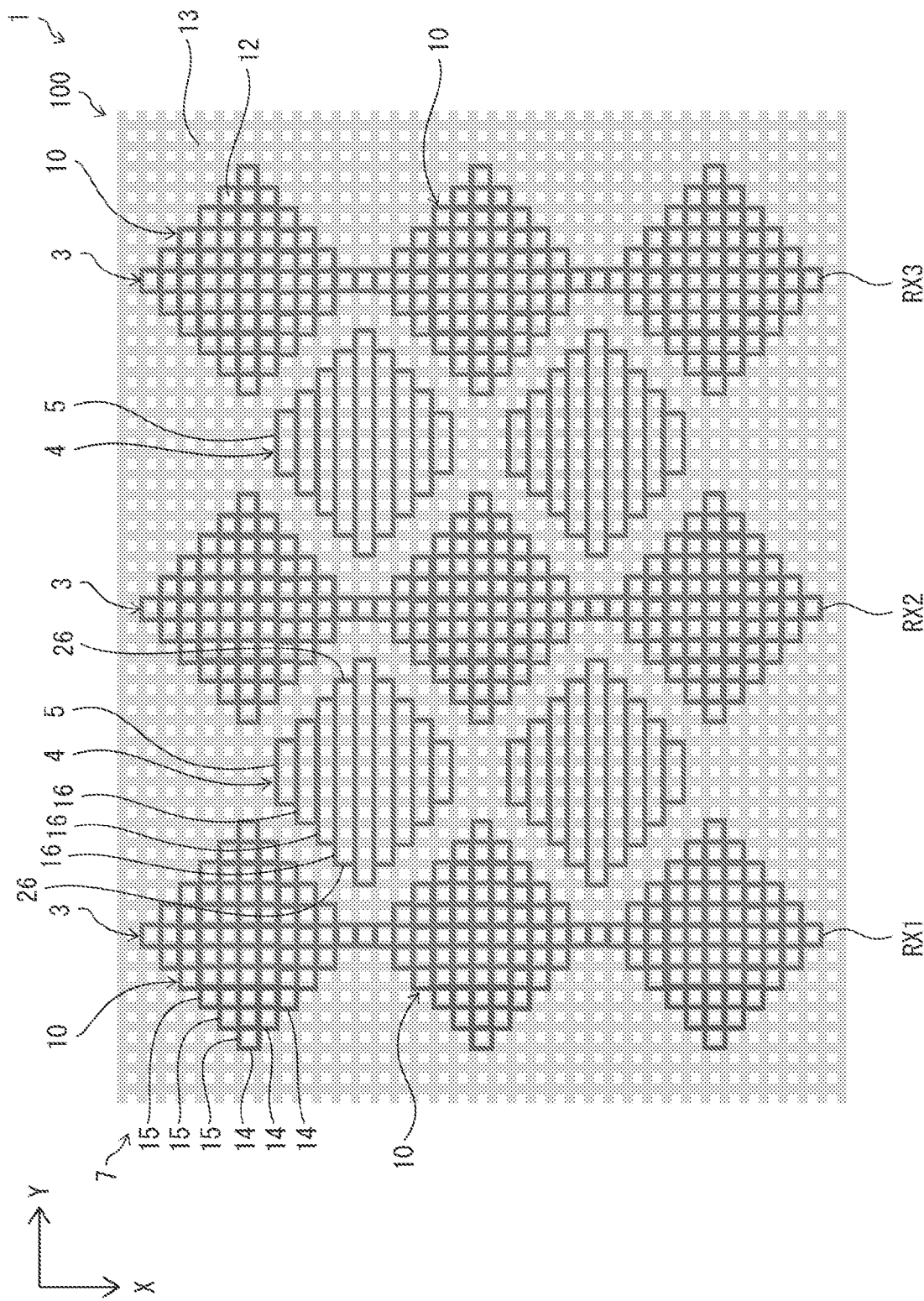
FIG. 3 is a plan view of a first electrode layer provided in a touch panel of this display device.
Figure 4:
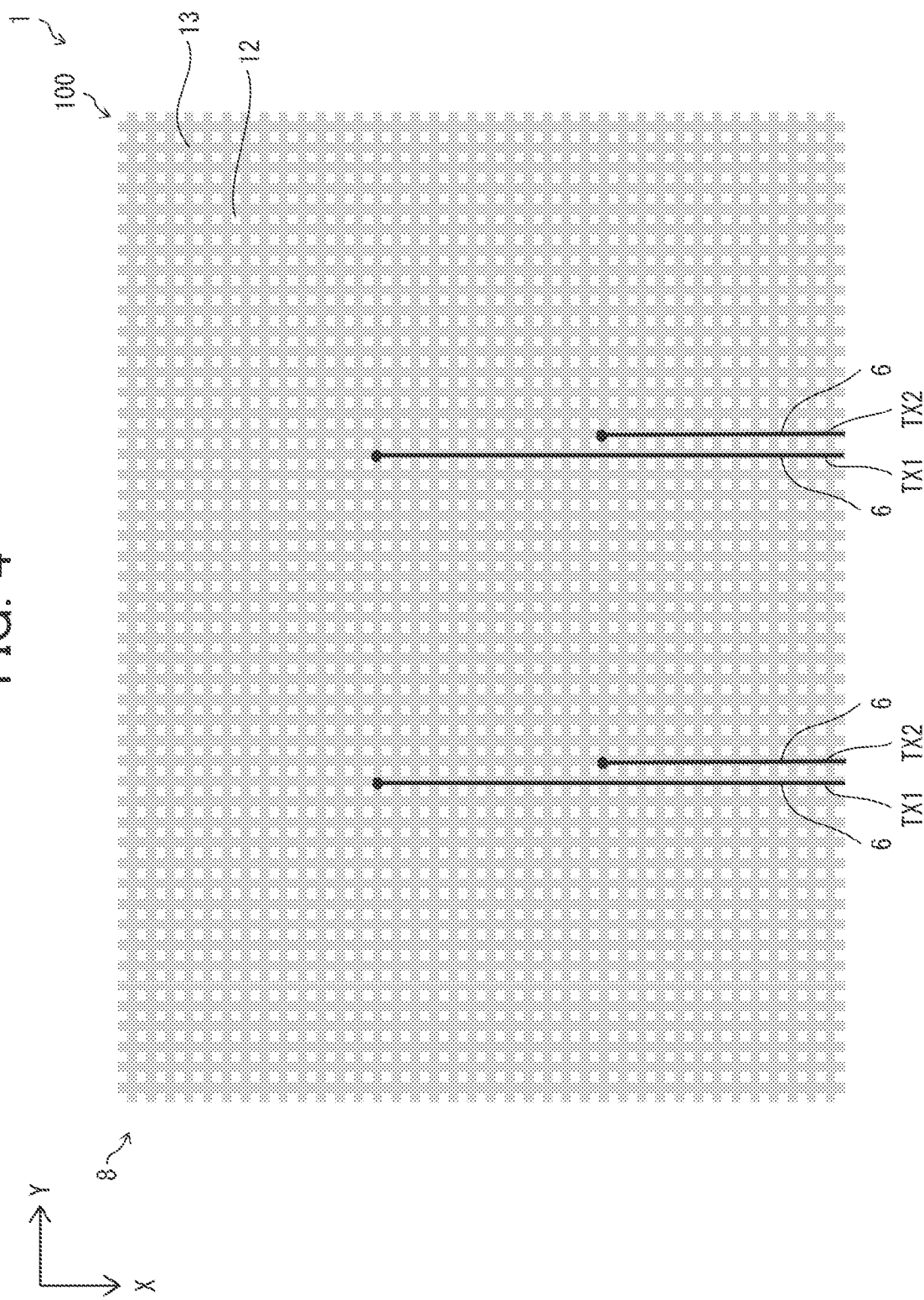
FIG. 4 is a plan view of a second electrode layer provided in the touch panel of the display device.
Figure 5:
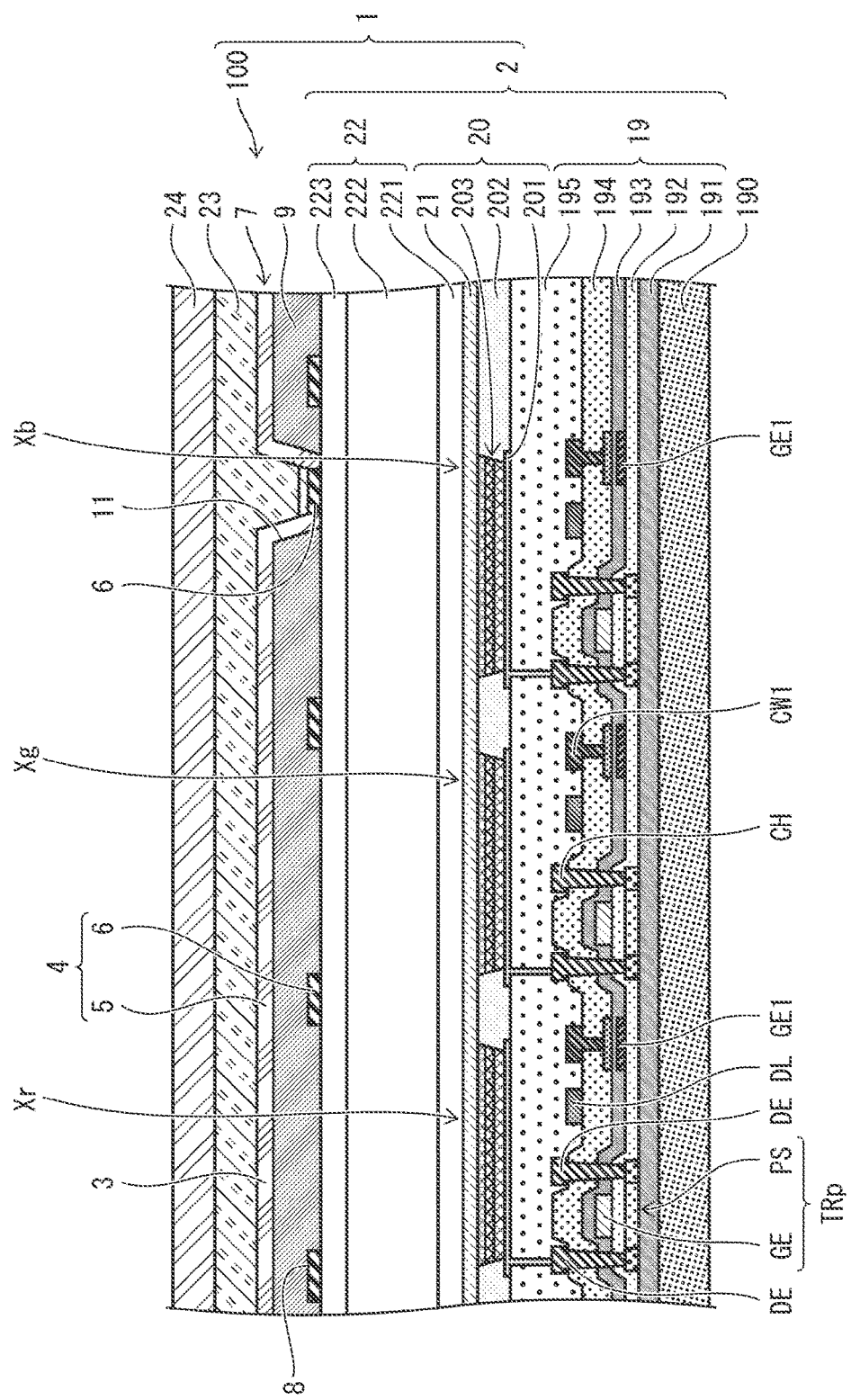
FIG. 5 is a cross-sectional view of the display device.

FIG. 1 is a plan view of a display device 1 in accordance with Embodiment 1. FIG. 2 is an enlarged view of portion A shown in FIG. 1. FIG. 3 is a plan view of a first electrode layer 7 provided in a touch panel 100 of the display device 1. FIG. 4 is a plan view of a second electrode layer 8 provided in the touch panel 100 of the display device 1. FIG. 5 is a cross-sectional view of the display device 1.

The display device 1 includes a display panel 2 and the touch panel 100 provided on the display panel 2. This touch panel 100 is not an out-cell type, which is separated from the display panel 2, but a semi-in-cell type, which is provided directly on the display panel 2. In other words, as will be described later, for example, the second electrode layer 8 and wires 6, which are elements of the touch panel 100, are provided directly on a second inorganic sealing film 223, which is an element of the display panel 2.

The touch panel 100 includes: a plurality of detection electrodes 3 extending parallel to each other in the X-direction (first direction) in a plan view; and a plurality of drive electrodes 4 extending in the X-direction between the plurality of detection electrodes 3 respectively.

Each of the plurality of drive electrodes 4 includes: a plurality of electrode segments 5 patterned in the X-direction; and two wires 6 each extending in the X-direction and connected to the plurality of electrode segments 5.

The touch panel 100 further includes: the first electrode layer 7; the second electrode layer 8 disposed between the first electrode layer 7 and the display panel 2; and an insulation layer 9 disposed between the first electrode layer 7 and the second electrode layer 8. The detection electrodes 3 and the electrode segments 5 of the drive electrodes 4 are provided in the first electrode layer 7. The wires 6 of the drive electrodes 4 are provided in the second electrode layer 8.

Each of the plurality of detection electrodes 3 includes a plurality of rhombus portions 10 stretching toward the Y-direction in a plan view. The electrode segments 5 are formed in a rhombus shape disposed in locations corresponding to gaps between those rhombus portions 10 that are adjacent in the X-direction.

The insulation layer 9 has contact holes 11 for connecting the electrode segments 5 in the first electrode layer 7 and the wires 6 in the second electrode layer 8.

The display panel 2 includes: a plurality of self-luminous display elements arranged in a matrix; and a plurality of pixel regions 12 arranged in a matrix correspondingly to the plurality of self-luminous display elements. Here, the self-luminous display elements have a structure in which a first electrode 201 (anode), an EL (electroluminescence) layer 203, and a second electrode 21 (cathode) 21 are stacked in this order and include self-luminous display elements Xr that emit red light, self-luminous display elements Xg that emit green light, and self-luminous display elements Xb that emit blue light.

The detection electrodes 3 and the drive electrodes 4 are provided along a light-blocking region 13 located between the plurality of pixel regions 12. The light-blocking region 13 includes, for example, an edge cover 202.

This light-blocking region 13 is provided in a lattice shape between the plurality of pixel regions 12. The detection electrodes 3 include a lattice of a first extension portion 14 extending in the X-direction on the light-blocking region 13 and a second extension portion 15 extending in the Y-direction on the light-blocking region 13. The electrode segments 5 have a generally rhombic external shape and are provided in stripes including: a plurality of segment extension portions 16 provided at prescribed X-direction-wise intervals and extending in the Y-direction on the light-blocking region 13; and a plurality of connection portions 26 extending in the X-direction from both ends of one of those two segment extension portions 16 that are adjacent to each other to connect these two adjacent segment extension portions 16.

The touch panel 100 further includes a control circuit 18 for detecting a mutual capacitance between the detection electrodes 3 and the electrode segments 5 of the drive electrodes 4 by supplying drive signals TX1 and TX2 to the wires 6 of the drive electrodes 4 and reading, from the detection electrodes 3, electric charge signals RX1, RX2, and RX3 based on the electric charges between the electrode segments 5 of the drive electrodes 4 and the detection electrodes 3.

The display panel 2 is an active matrix (AM) OLED (organic light-emitting diode) panel.

The display panel 2 includes: a TFT (thin film transistor) layer 19 including transistors TRp on a base material 190; a light-emitting element layer 20 on the TFT layer 19; and a sealing layer 22 on the light-emitting element layer 20. The TFT layer 19 includes: a barrier layer (undercoat layer) 191; a semiconductor layer PS overlying the barrier layer 191; a first inorganic layer 192 overlying the semiconductor layer PS; a first metal layer (including gate electrodes GE, gate lines GE1, and emission control lines) overlying the first inorganic layer 192; a second inorganic layer 193 overlying the first metal layer; a second metal layer (including capacitor lines CW) overlying the second inorganic layer 193; a third inorganic layer 194 overlying the second metal layer; a third metal layer (including a conductive layer DE, data signal lines DL, high-voltage power supply lines (not shown), a main line (not shown) for the high-voltage power supply lines, and a main line for low-voltage power supply lines (not shown)) overlying the third inorganic layer 194; and a planarization film 195 overlying the third metal layer.

The light-emitting element layer 20 includes: the first electrode 201 overlying the planarization film 195; the insulating edge cover 202 covering the first electrode 201; the EL (electroluminescence) layer 203 overlying the edge cover 202; and the second electrode 21 (cathode) overlying the EL layer 203.

The sealing layer 22 may include two inorganic sealing films 221, 223 and an organic sealing film 222 between these films.

The touch panel 100 is provided on the display panel 2. A planarization layer 23 and a circular polarizer 24 are provided in this order on the touch panel 100.

In this manner, the detection electrodes 3 and the drive electrodes 4 of the touch panel 100 are arranged along the light-blocking region 13 between the pixel regions 12 over the sealing layer 22 of the display panel 2 in such a manner as to not give a negative effect on the image displayed on the display panel 2.

Then, the detection electrodes 3 and the drive electrodes 4 of the touch panel 100 extend in the same X-direction to reduce cross-coupling capacitance. The first electrode layer 7 and the second electrode layer 8 are separated by the insulation layer 9.

The electrode segment 5 of the drive electrode 4 is routed through the contact hole 11 in the insulation layer 9 and connected to the wire 6.

Referring to FIG. 3, the first electrode layer 7 includes the detection electrodes 3 including the plurality of rhombus portions 10 extending in the X-direction and stretching in the Y-direction. These detection electrodes 3 are provided in a lattice shape including the first extension portion 14 extending in the X-direction on the light-blocking region 13 and the second extension portion 15 extending in the Y-direction on the light-blocking region 13.

The first electrode layer 7 further includes the electrode segments 5 of the drive electrodes 4. These electrode segments 5 are provided in stripes including the plurality of segment extension portions 16 extending in the Y-direction on the light-blocking region 13 and the plurality of connection portions 26 extending in the X-direction from both ends of one of those two segment extension portions 16 that are adjacent to each other to connect these two adjacent segment extension portions 16.

Referring to FIG. 4, the second electrode layer 8 includes the plurality of wires 6 connected respectively to the plurality of electrode segments 5 of the drive electrodes 4. The wires 6 extend in the same X-direction as the detection electrodes 3. Therefore, the detection electrodes 3 and the drive electrodes 4 do not cross in a plan view. Therefore, the cross-coupling capacitance is reduced.

In this manner, according to Embodiment 1, the drive electrodes 4 and the detection electrodes 3 of the touch panel 100 on the display panel 2, since extending parallel to each other, do not cross each other. Therefore, even if the drive electrodes 4 and the detection electrodes 3 are located in proximity to the first electrodes 201 (anodes) of the display panel 2, the parasitic capacitance related to the drive electrodes 4 and the detection electrodes 3 does not increase, which prevents deterioration of the time constant. Hence, the display device 1 can be provided that exhibits high sensitivity to changes in small capacitance even if the touch panel 100 is provided on the display panel 2.

Embodiment 2

Figure 6:
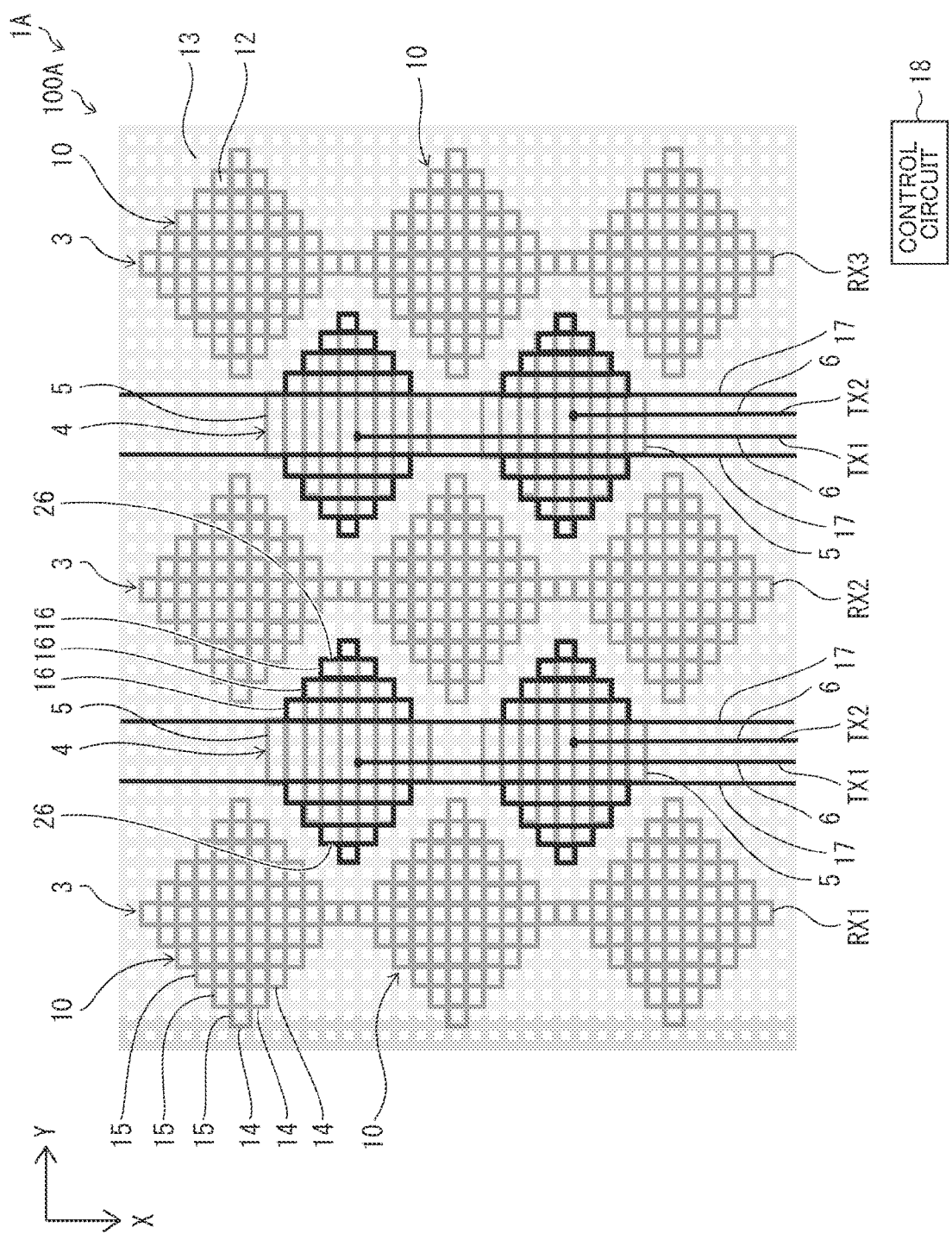
FIG. 6 is a plan view of a display device in accordance with Embodiment 2.
Figure 7:
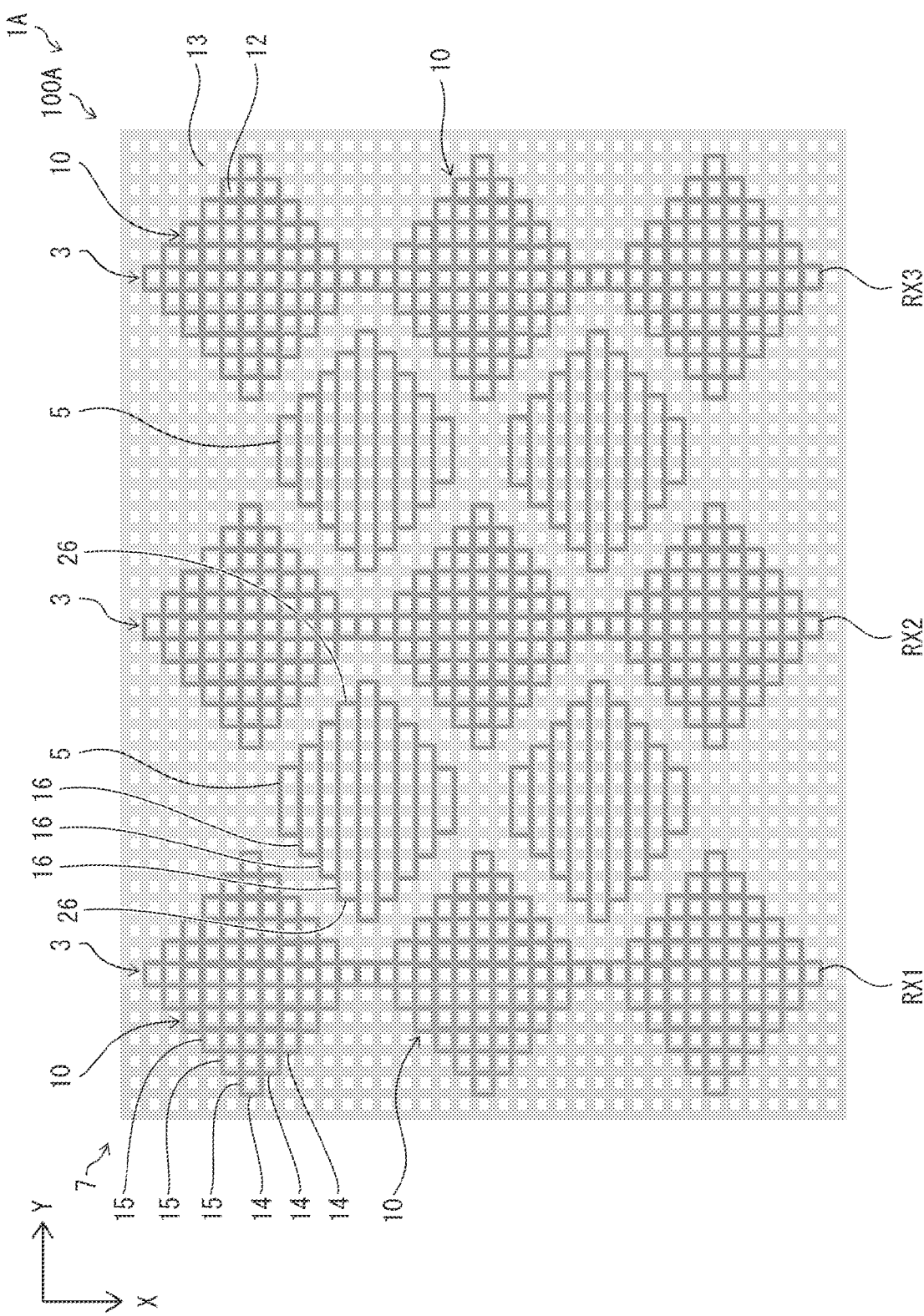
FIG. 7 is a plan view of a first electrode layer provided in a touch panel of this display device.
Figure 8:
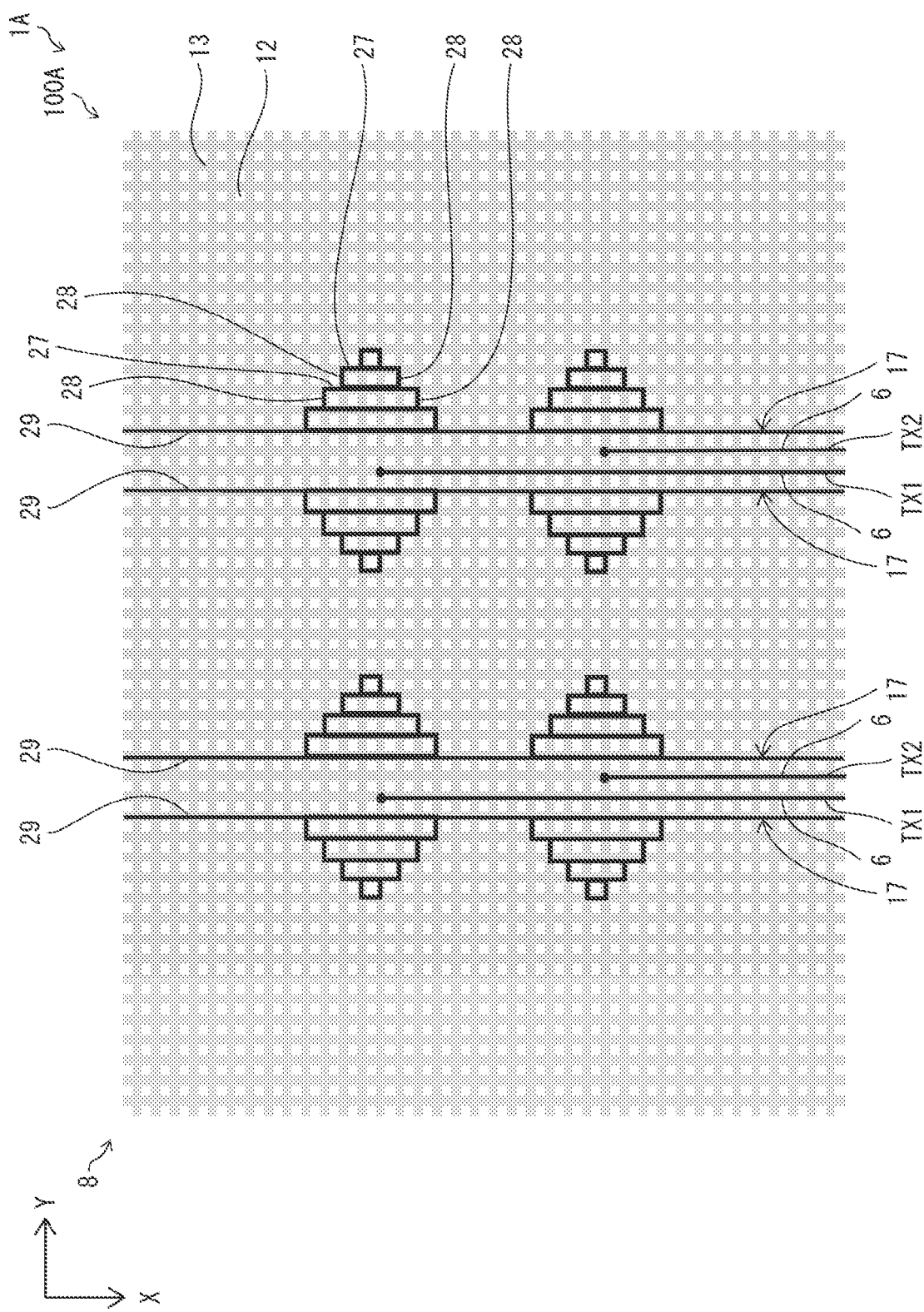
FIG. 8 is a plan view of a second electrode layer provided in the touch panel of the display device.

FIG. 6 is a plan view of a display device 1A in accordance with Embodiment 2. FIG. 7 is a plan view of a first electrode layer 7 in a touch panel 100A of the display device 1A. FIG. 8 is a plan view of a second electrode layer 8 in the touch panel 100A of the display device 1A. Members that are similar to those described earlier are indicated by similar reference numerals. Therefore, the description thereof is not repeated.

This display device 1A differs from the aforementioned display device 1 in accordance with Embodiment 1 in that the second electrode layer 8 in the touch panel 100A includes shield electrodes 17.

The display device 1A includes the display panel 2 and the touch panel 100A on the display panel 2. The touch panel 100A includes a plurality of detection electrodes 3 and a plurality of drive electrodes 4, both provided in the first electrode layer 7 and extending in the X-direction. Each of the plurality of drive electrodes 4 includes: a plurality of electrode segments 5 in the first electrode layer 7; and two wires 6, in the second electrode layer 8, connected respectively to the plurality of electrode segments 5 and extending in the X-direction.

Referring to FIG. 8, the second electrode layer 8 further includes the plurality of shield electrodes 17 extending in the same X-direction as the wires 6 of the drive electrodes 4. Each shield electrode 17 includes: a basic extension portion 29 extending in the X-direction through the plurality of electrode segments 5 in a plan view; a plurality of partial extension portions 27 provided at prescribed Y-direction-wise intervals in the second electrode layer 8 correspondingly to each one of the electrode segments 5 and extending in the X-direction on the light-blocking region 13; and a plurality of connection portions 28 extending in the Y-direction from both ends of the partial extension portions 27 to connect either the partial extension portions 27 that are adjacent to each other or the partial extension portion 27 and the basic extension portion 29.

The shield electrodes 17 shield from noise from the display panel 2 or reduce the virtual capacitance that serves as a load to the detection electrodes 3. To describe it in detail, the shield electrodes 17 block an electric field between the electrode segments 5 and the electrodes and/or wires of the display panel 2. The shield electrodes 17 are fed with signals similar to the drive signals TX1 and TX2 fed to the wires 6.

Since the drive electrodes 4 and the detection electrodes 3 extend parallel to each other in Embodiment 2 as in Embodiment 1, the drive electrodes 4 and the detection electrodes 3 do not cross each other. Therefore, even if the drive electrodes 4 and the detection electrodes 3 are located in proximity to the first electrodes 201 (anodes) of the display panel 2, the parasitic capacitance related to the drive electrodes 4 and the detection electrodes 3 does not increase, which prevents deterioration of the time constant. Hence, the display device 1A can be provided that exhibits high sensitivity to changes in small capacitance even if the touch panel 100A is provided on the display panel 2.

In addition, since the touch panel 100A further includes the shield electrodes 17 provided in the second electrode layer 8 and extending along the wires 6, it is possible to shield the touch panel 100A from noise from the display panel 2 or reduce the virtual capacitance that serves as a load to the detection electrodes 3.

Embodiment 3

Figure 9:
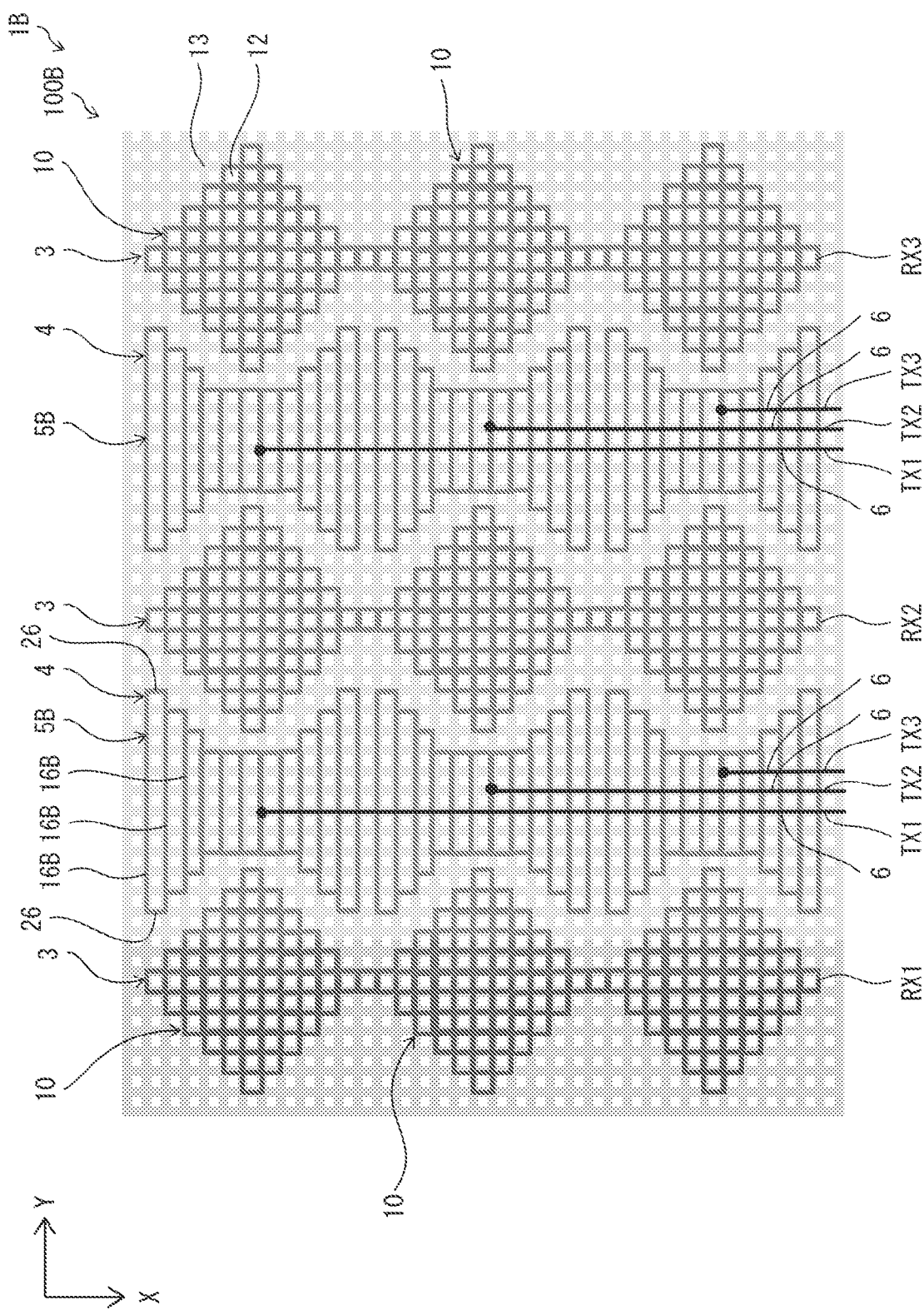
FIG. 9 is a plan view of a display device in accordance with Embodiment 3.
Figure 10:
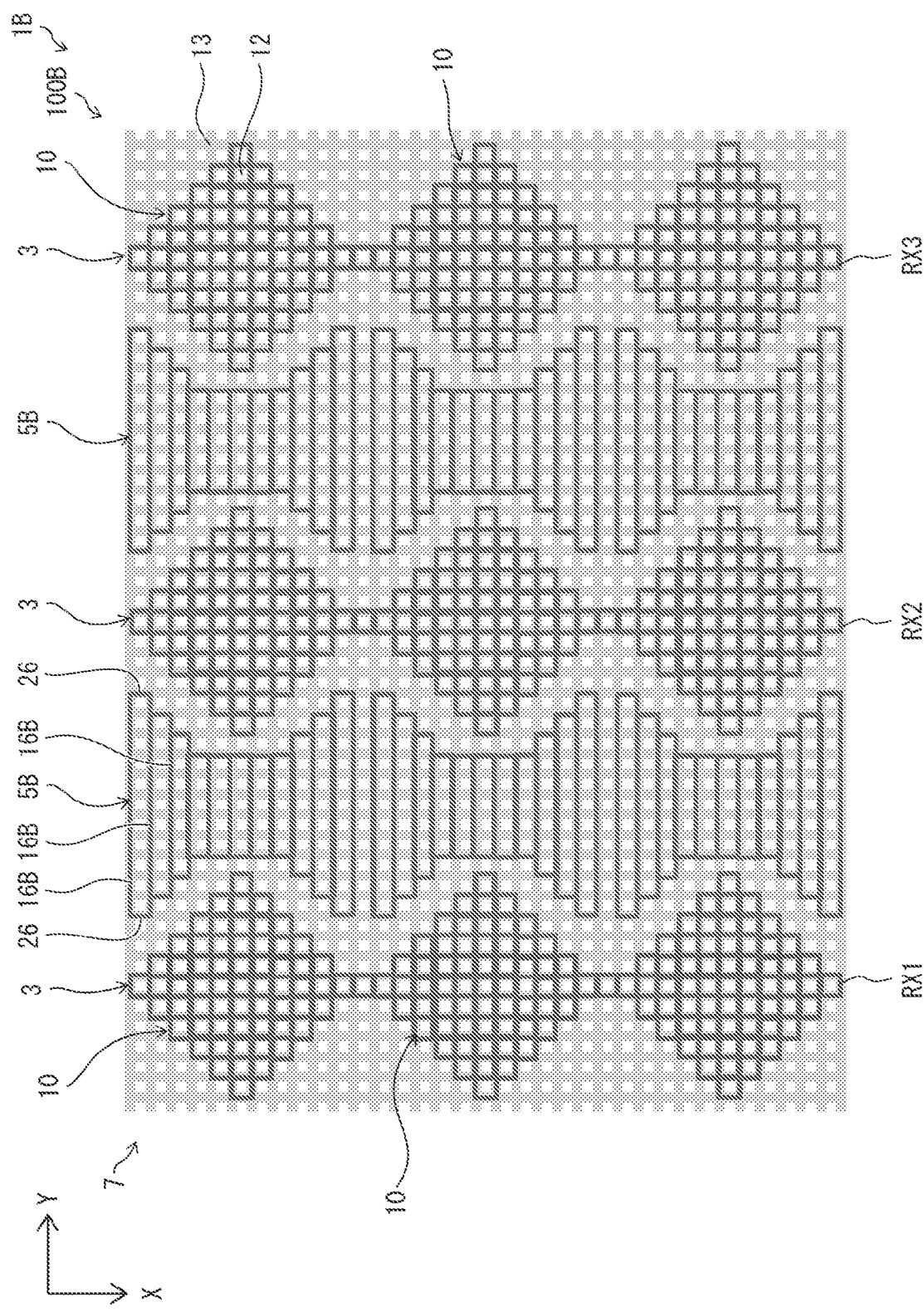
FIG. 10 is a plan view of a first electrode layer provided in a touch panel of this display device.
Figure 11:
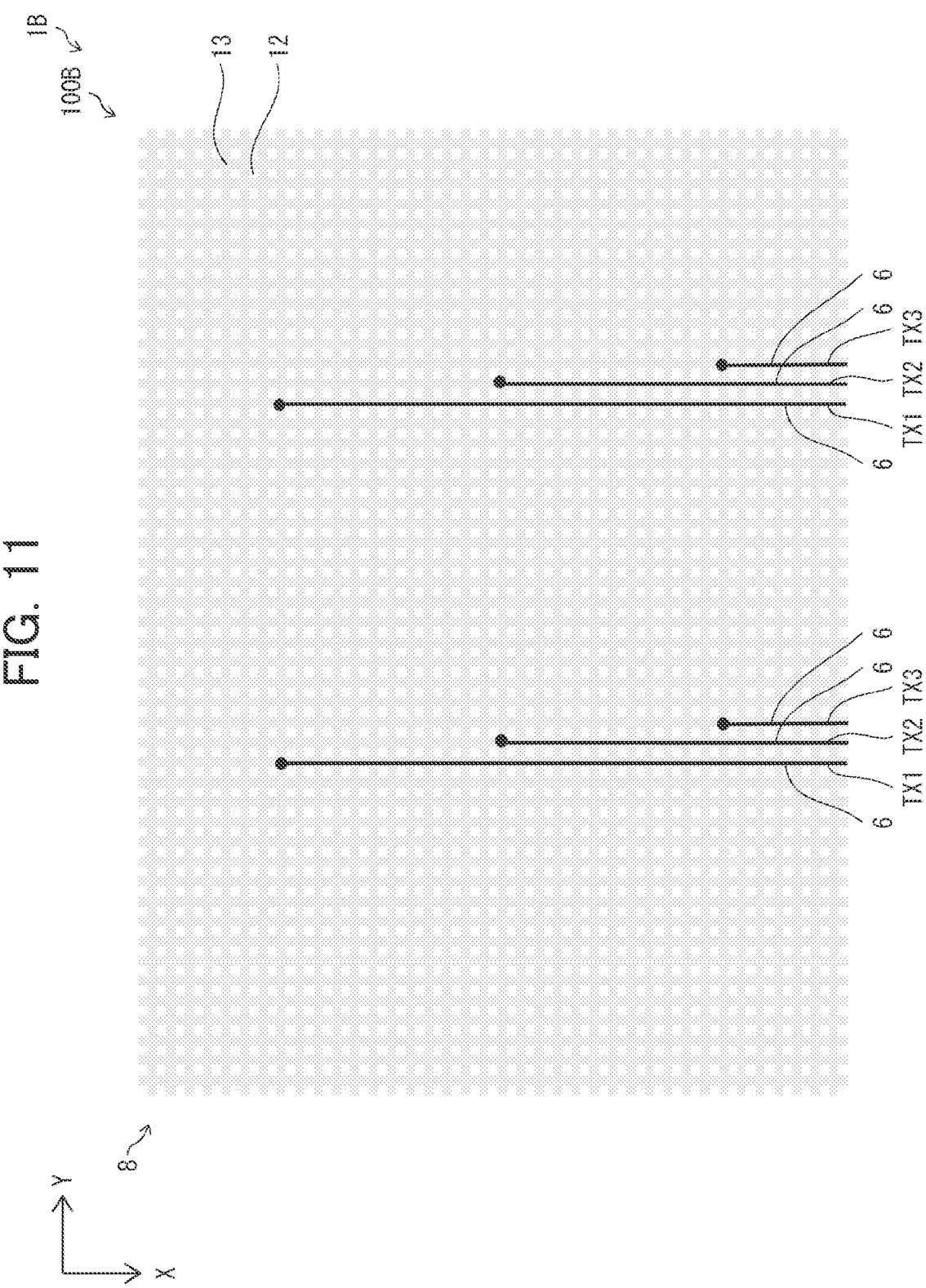
FIG. 11 is a plan view of a second electrode layer provided in the touch panel of the display device.

FIG. 9 is a plan view of a display device 1B in accordance with Embodiment 3. FIG. 10 is a plan view of a first electrode layer 7 in a touch panel 100B of the display device 1B. FIG. 11 is a plan view of a second electrode layer 8 in the touch panel 100B of the display device 1B. Members that are similar to those described earlier are indicated by similar reference numerals. Therefore, the description of these members is not repeated.

This display device 1B differs from the aforementioned display device 1 in accordance with Embodiment 1 in that the drive electrodes 4 in the touch panel 100B include electrode segments 5B and that there are provided three wires 6.

The display device 1B includes the display panel 2 and the touch panel 100B on the display panel 2. The touch panel 100B includes a plurality of detection electrodes 3 and a plurality of drive electrodes 4, both provided in the first electrode layer 7 and extending in the X-direction. Each of the plurality of drive electrodes 4 includes: a plurality of electrode segments 5B in the first electrode layer 7; and three wires 6, in the second electrode layer 8, connected respectively to the plurality of electrode segments 5B and extending in the X-direction. The three wires 6 are fed respectively with drive signals TX1, TX2, and TX3.

The electrode segment 5B has an external shape including hyperbolic sides facing the rhombus portion 10 of the detection electrode 3 adjacent to either side in a plan view. The electrode segments 5B are provided in stripes including: a plurality of segment extension portions 16B provided at prescribed X-direction-wise intervals and extending in the Y-direction on the light-blocking region 13; and a plurality of connection portions 26 extending in the X-direction from both ends of one of those two segment extension portions 16B that are adjacent to each other to connect these two adjacent segment extension portions 16B.

Since the drive electrodes 4 and the detection electrodes 3 extend parallel to each other in Embodiment 3 as in Embodiment 1, the drive electrodes 4 and the detection electrodes 3 do not cross each other. Therefore, even if the drive electrodes 4 and the detection electrodes 3 are located in proximity to the first electrodes 201 (anodes) of the display panel 2, the parasitic capacitance related to the drive electrodes 4 and the detection electrodes 3 does not increase, which prevents deterioration of the time constant. Hence, the display device 1B can be provided that exhibits high sensitivity to changes in small capacitance even if the touch panel 100B is provided on the display panel 2.

Figure 12:
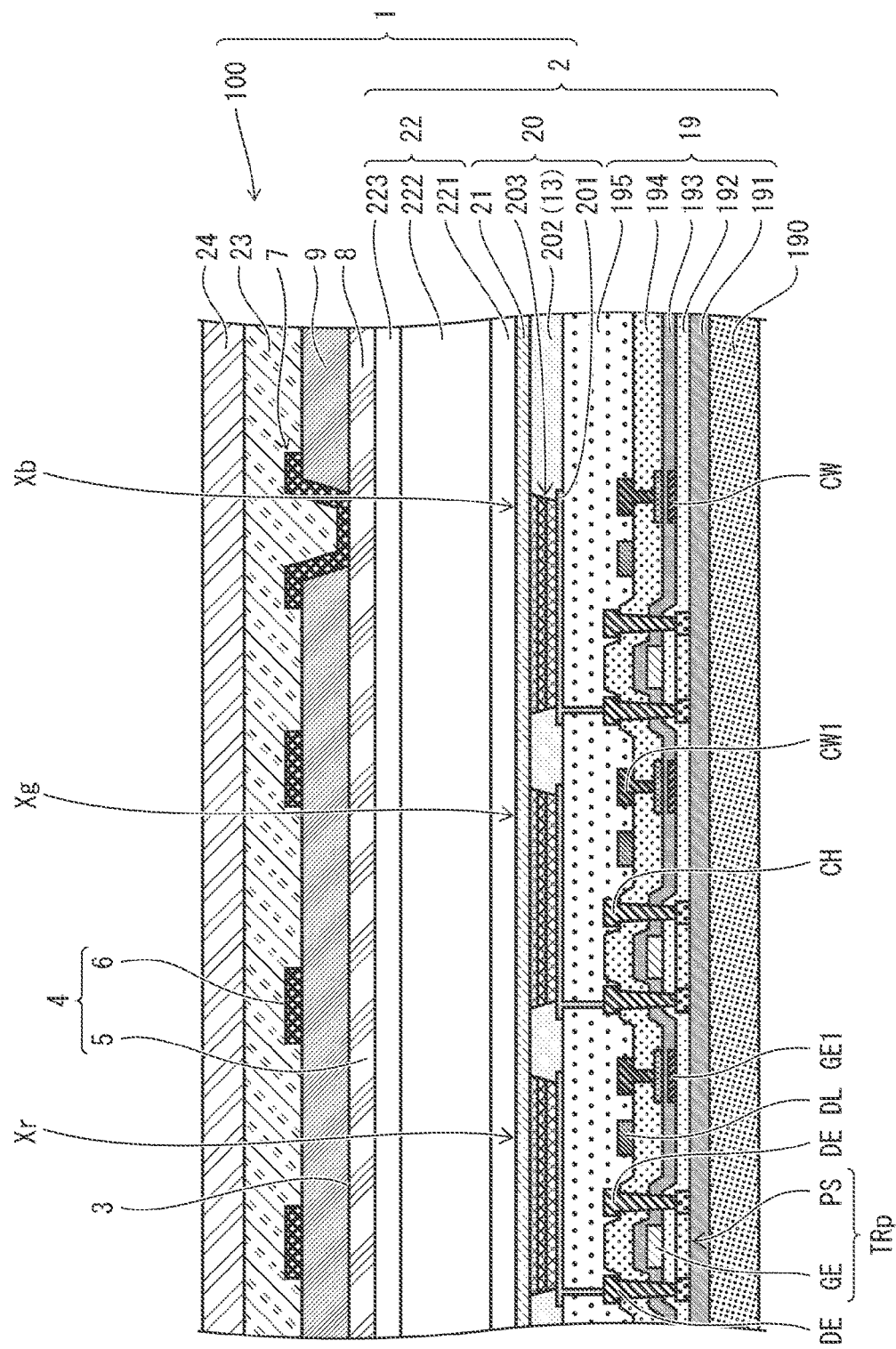
FIG. 12 is a cross-sectional view of a variation example of the display device.

FIG. 12 is a cross-sectional view of a variation example of the display device 1. Members that are similar to those described earlier in FIG. 5 are indicated by similar reference numerals. Therefore, the description of these members is not repeated.

The wires 6 of the drive electrodes 4 may be disposed in the second electrode layer 8 as shown in FIG. 5 and may be disposed in the first electrode layer 7 as shown in FIG. 12. When the wires 6 of the drive electrodes 4 are disposed in the first electrode layer 7, the detection electrodes 3 and the electrode segments 5 of the drive electrodes 4 are disposed in the second electrode layer 8.

Figure 13:
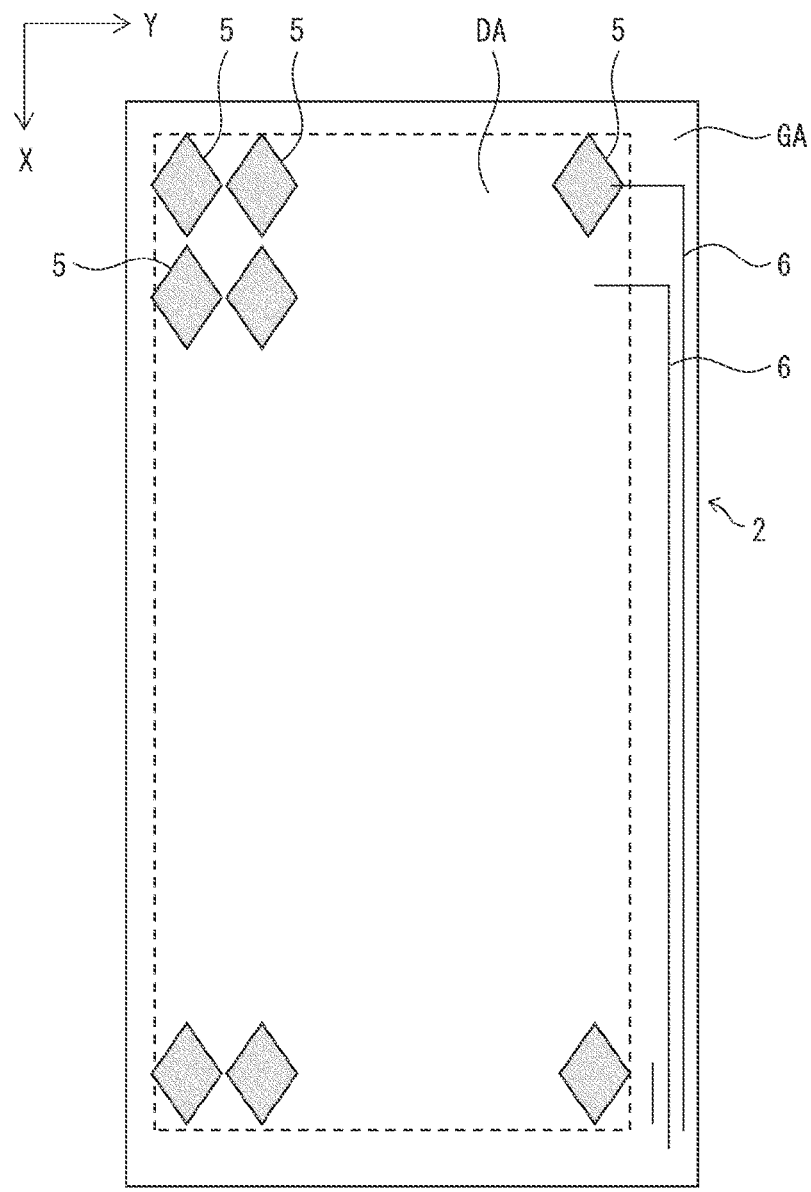
FIG. 13 is a plan view showing the arrangement of wires in a display device in accordance with a comparative example.
Figure 14:
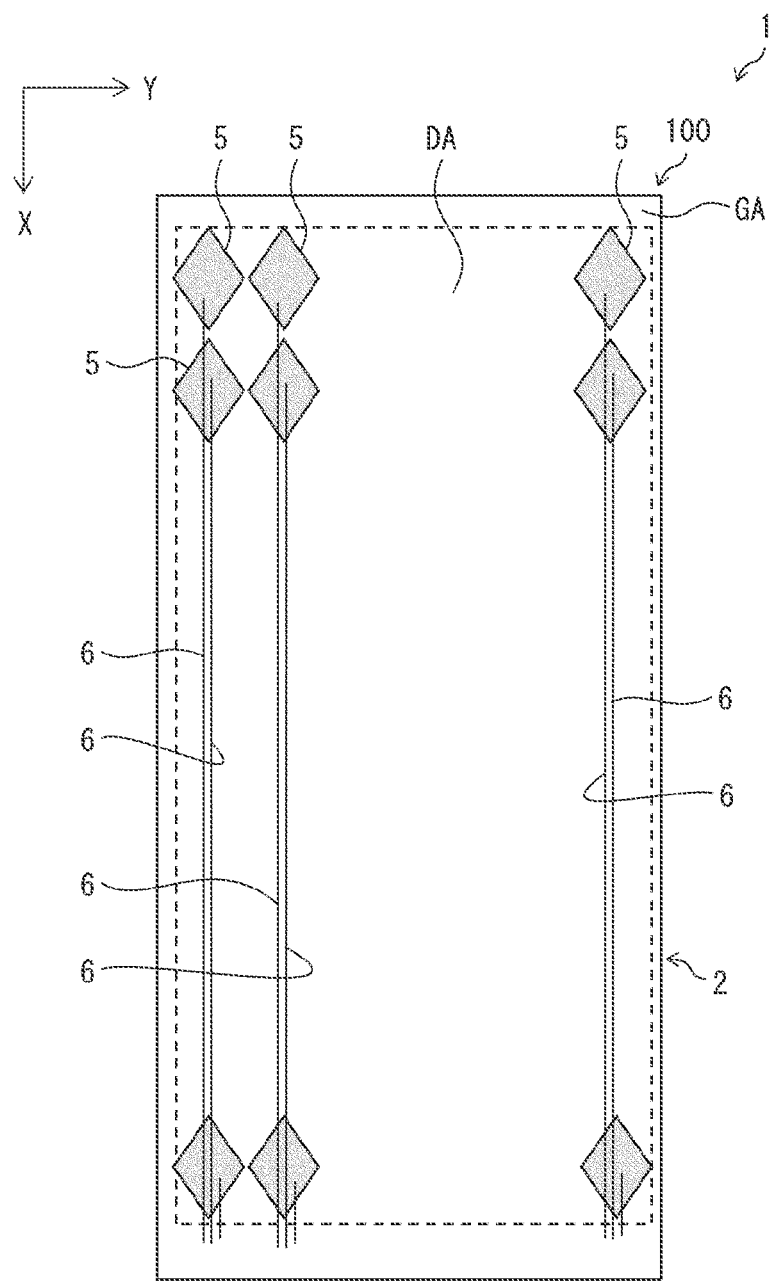
FIG. 14 is a plan view showing the arrangement of wires in the display devices in accordance with Embodiments 1 to 3.

FIG. 13 is a plan view showing the arrangement of the wires 6 in a touch panel in accordance with a comparative example. FIG. 14 is a plan view showing the arrangement of the wires 6 in the touch panel 100 in accordance with Embodiment 1. The display panel 2 has: a display area DA in which a matrix of self-luminous display elements is disposed, and a frame area GA surrounding the display area DA.

In the comparative example, the wires 6 are connected to the plurality of electrode segments 5 patterned in the Y-direction and are extended in the Y-direction in the display area DA before being extended in the X-direction in the frame area GA, as shown in FIG. 13. Therefore, the frame area GA needs to have such a width as to allow the plurality of wires 6 to be extended parallel to each other in the X-direction, which presents difficulty in reducing the width of the frame area.

In contrast, in the touch panel 100 in accordance with Embodiment 1, the wires 6 are extended from the plurality of electrode segments 5 directly in the X-direction in the display area DA. Therefore, unlike the comparative example, there is no need to extend the frame area GA in the X-direction. Accordingly, the width of the frame area GA of the touch panel 100 in accordance with Embodiment 1 can be reduced over the comparative example.

Figure 15:
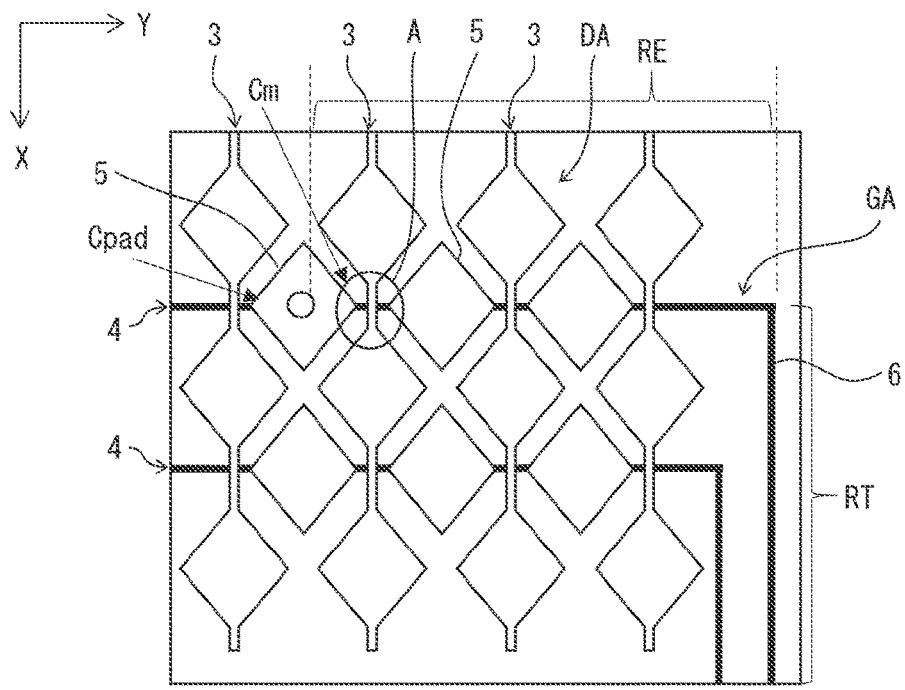
FIG. 15 is a diagram illustrating the time constant of a wire in a display device in accordance with a comparative example.
Figure 16:
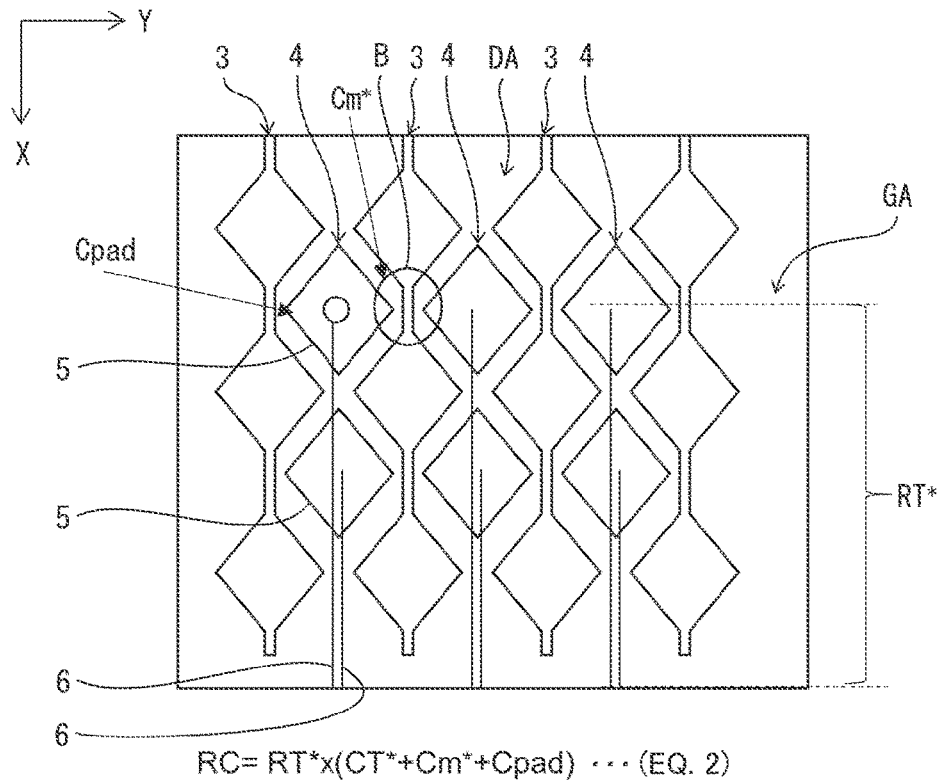
FIG. 16 is a diagram illustrating the time constant of a wire in the display devices in accordance with Embodiments 1 to 3.

FIG. 15 is a diagram illustrating the time constant of the wires 6 in a touch panel in accordance with a comparative example. FIG. 16 is a diagram illustrating the time constant of the wires 6 in the touch panel 100 in accordance with Embodiment 1.

In the touch panel in accordance with the comparative example, the detection electrodes 3 extending in the X-direction and the drive electrodes 4 extending in the Y-direction cross each other in a plan view. Since changes in the electrostatic capacity in this location A where the electrodes cross are detected, parasitic capacitance increases if the detection electrodes 3 and the drive electrodes 4 are located in proximity to the cathode electrode or anode electrode of an OLED. Therefore, there are problems that the time constant RC deteriorates, which in turn reduces sensitivity to changes in small capacitance.

As shown in (Eq. 1) in FIG. 15, this time constant RC varies depending on the resistance RT of the location where the wires 6 of the drive electrodes 4 extend in the X-direction in the frame area GA all the way to a control IC (integrated circuit, not shown) and on the resistance RE of the location where the wires 6 of the drive electrodes 4 extend in the Y-direction in the display area DA.

Both the cathode-electrode-coupling capacitance and the electrode-cross-coupling capacitance increase load capacitance. Then, because the lengths of the wires 6 of the different electrode segments 5 of the drive electrodes 4 significantly differ, the electric charge signals based on the electric charge in location A where the detection electrodes 3 and the drive electrodes 4 cross loses uniformity.

In contrast, in the touch panel 100 in accordance with Embodiment 1, as shown in (Eq. 2) in FIG. 16, the time constant RC in, for example, location B varies depending only on the resistance RT #<@*@># of the location where the wires 6 of the drive electrodes 4 extend in the X-direction in the display area DA all the way to a control IC (not shown), and the location where the wires 6 extend in the Y-direction in the display area DA disappears. Therefore, the time constant RC is reduced over the comparative example.

In the touch panel 100 in accordance with Embodiment 1, since the detection electrodes 3 and the drive electrodes 4 do not cross, no cross-coupling capacitance occurs. Therefore, the total load capacitance is reduced. In addition, since the lengths of the wires 6 of the different electrode segments 5 of the drive electrodes 4 do not differ so much as in the comparative example, the electric charge signals based on the electric charge between the detection electrodes 3 and the drive electrodes 4 become uniform.

Note that although an example has been described in which the display panel 2 is an OLED panel, the disclosure is not necessarily limited to this example. The display panel 2 may be a QLED (quantum-dot light-emitting diode) panel and may be a liquid crystal panel.

Figure 17:
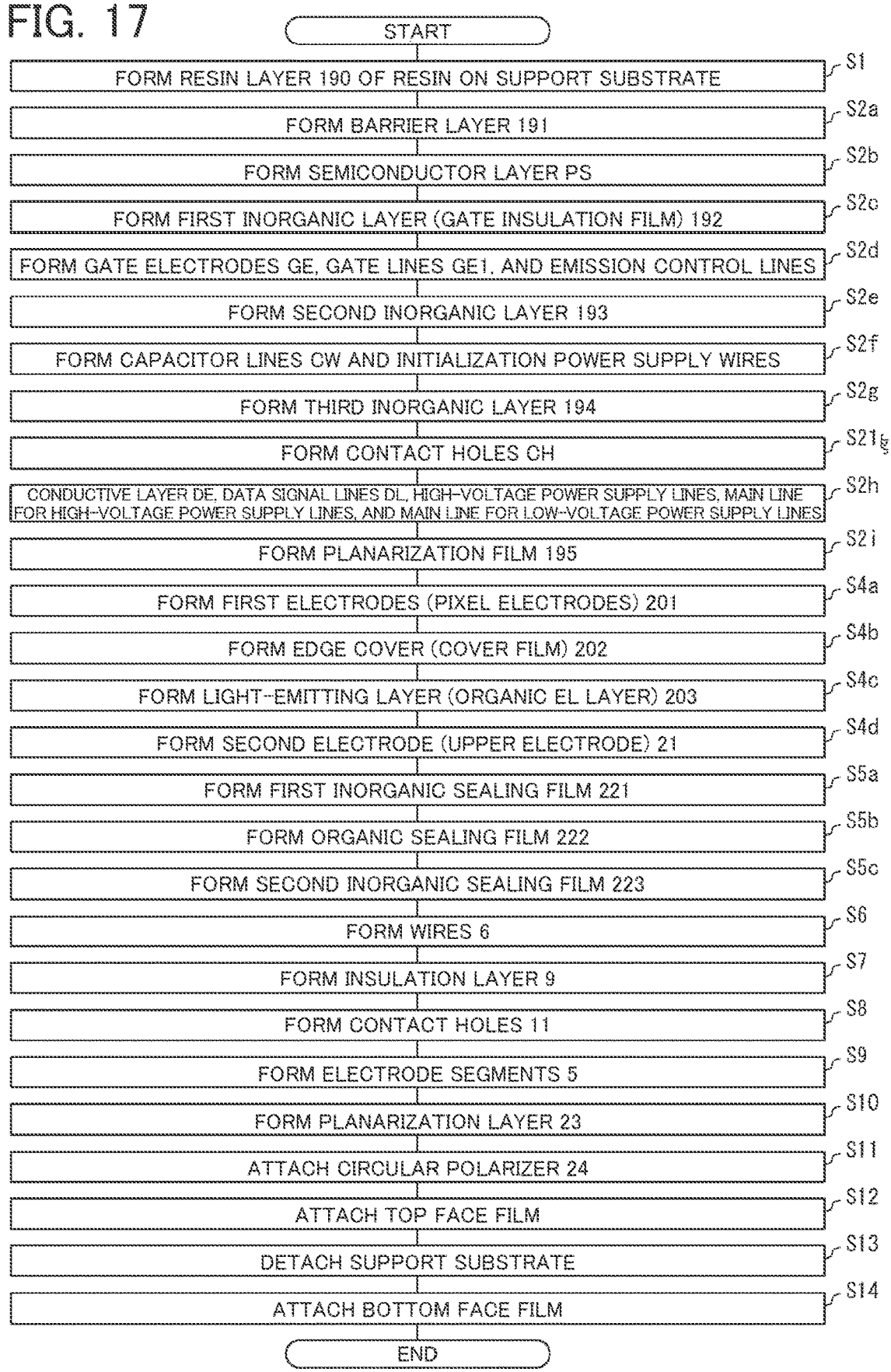
FIG. 17 is a flow chart representing a method of manufacturing the display device in accordance with Embodiment 1.

A description is given next of a method of manufacturing the display device 1 in accordance with Embodiment 1 with reference to FIGS. 17 and 5. FIG. 17 is a flow chart representing a method of manufacturing the display device 1 in accordance with Embodiment 1.

First, for the display panel 2, the base material 190 is formed in step S1 by applying a resin onto a support substrate (not shown) by coating (step S1). Next, the barrier layer (undercoat layer) 191 is provided on the base material 190 by CVD chemical vapor deposition) (step S2a).

Next, an amorphous semiconductor layer is formed by CVD and dehydrogenated and subjected to laser annealing to form a crystalline semiconductor layer (semiconductor layer PS) (step S2b). The semiconductor layer PS contains, for example, a low-temperature polysilicon (LTPS) or an oxide semiconductor.

Next, the first inorganic layer (gate insulation film) 192 is formed on the semiconductor layer PS and the barrier layer 191 by CVD (step S2c). Next, the first metal layer is formed by sputtering, and the gate electrodes GE, the gate lines GE1, and the emission control lines (not shown) are patterned by photolithography (step S2d). The gate electrodes GE, the gate lines GE1, and the emission control lines include, for example, a monolayer or multilayer film of at least one of metals of aluminum (Al), tungsten (W), molybdenum (Mo), tantalum (Ta), chromium (Cr), titanium (Ti), and copper (Cu).

Next, the second inorganic layer 193 is formed by CVD (step S2e). Next, the second metal layer is formed by sputtering, and the capacitor lines CW are formed by photolithography (step S2f). The capacitor lines CW include, for example, a monolayer or multilayer film of at least one of metals of aluminum (Al), tungsten (W), molybdenum (Mo), tantalum (Ta), chromium (Cr), titanium (Ti), and copper (Cu).

Next, the third inorganic layer 194 is formed by CVD (step S2g). Here, the first inorganic layer 192, the second inorganic layer 193, and the third inorganic layer 194 may include, for example, a film of silicon oxide, silicon nitride, or silicon oxynitride, or a stack of any of these films.

Next, contact holes CH are formed in the first inorganic layer 192, the second inorganic layer 193, and the third inorganic layer 194 on a conductive region of the semiconductor layer PS by etching (step S21g).

Next, the third metal layer is formed by sputtering, and the conductive layer DE, the data signal lines DL, the high-voltage power supply lines (not shown), the main line for the high-voltage power supply lines (not shown), and the main line for the low-voltage power supply lines (not shown) are patterned by photolithography (step S2h).

Here, the conductive layer DE, the data signal lines DL, the high-voltage power supply lines (not shown), the main line for the high-voltage power supply lines (not shown), and the main line for the low-voltage power supply lines (not shown) include, for example, a monolayer or multilayer film of at least one of metals of aluminum (Al), tungsten (W), molybdenum (Mo), tantalum (Ta), chromium (Cr), titanium (Ti), and copper (Cu).

Next, the planarization film 195 is formed by coating (step S2i). Next, a fourth metal layer is formed by sputtering, and the first electrodes (pixel electrodes) 201 are formed by photolithography (step 4Sa). The first electrodes 201 include, for example, a stack of an ITO (indium tin oxide) layer and a Ag-containing alloy layer and is reflective to light (described later in detail).

Next, a resin layer is formed by coating, and the edge cover 202 is formed by photolithography (step S4b). The edge cover 202 may be made of, for example, a photosensitive organic material, such as polyimide or acrylic, that can be provided by printing or coating technology.

Next, the light-emitting layer (organic EL layer) 203 is formed by vapor deposition (step S4c). The light-emitting layer 203 is made of, for example, a stack of a hole injection layer, a hole transport layer, a light-emitting layer, an electron transport layer, and an electron injection layer, all of which are provided in this order when viewed from below.

Next, the second electrode 21 is formed by vapor deposition (step S4d). The second electrode 21 (cathode) may be made of, for example, a transparent, conductive member such as ITO or IZO (indium zinc oxide).

Next, the inorganic sealing film 221 is formed by CVD (step S5a). The organic sealing film 222 is further formed by coating (step S5b). Next, the second inorganic sealing film 223 is formed by CVD (step S5c).

The display panel 2 is provided by these steps.

Next, the wires 6 of the drive electrodes 4 and the shield electrodes 17 are formed on the sealing layer 22 in the display panel 2 by vapor deposition using a metal mask (step S6). Next, the insulation layer 9, covering the wires 6 and the shield electrodes 17, is formed by coating (step S7).

Next, the contact holes 11 are formed by photolithography (step S8). Next, the electrode segments 5 of the drive electrodes 4 and the first electrode layer 7 including the detection electrodes 3 are formed on the insulation layer 9 by vapor deposition using a metal mask (step S9).

The wires 6 and the electrode segments 5 may be made of, for example, silver (Ag), aluminum (Al), titanium (Ti), molybdenum (Mo), or copper (Cu), or a transparent material such as ITO, IZO, ZnO, or polystyrene sulfonate (PEDOT: PSS).

Next, the planarization layer 23 is formed by coating (step S10). The planarization layer 23 and the insulation layer 9 may be made of an acrylic-based resin or an epoxy-based resin.

Next, the circular polarizer 24 is attached via an adhesive material layer (step S11). Next, a top face film (not shown) is attached via an adhesive material layer (step S12). Next, the support substrate is detached from the base material 190 by projecting laser from a side of the support substrate on which the TFT layer 19 is not formed (step S13). Next, a bottom face film (not shown) is attached to a side of the base material 190 on which the TFT layer 19 is not formed (step S14).

These steps form the touch panel 100 on the display panel 2, which completes the manufacture of the display device 1 in accordance with Embodiment 1.

Embodiment 4

Figure 18:
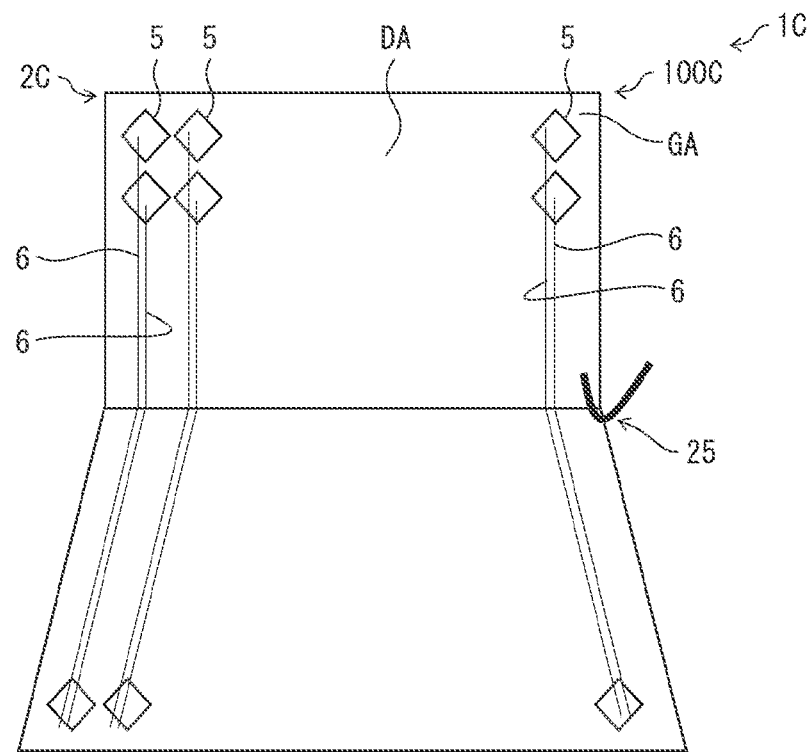
FIG. 18 is a schematic illustration of a display device in accordance with Embodiment 4.
Figure 19:
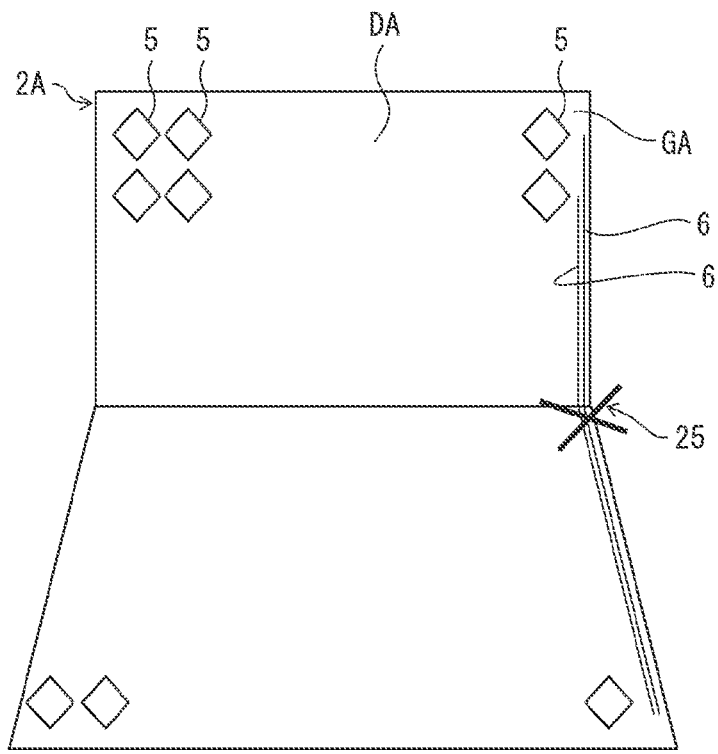
FIG. 19 is a schematic illustration of a display device in accordance with a comparative example.

FIG. 18 is a schematic illustration of a display device 1C in accordance with Embodiment 4. FIG. 19 is a schematic illustration of a display device in accordance with a comparative example. Members that are similar to those described earlier are indicated by similar reference numerals. Therefore, the description thereof is not repeated.

The display device 1C includes a foldable, foldable display panel 2C. A touch panel 100C may be formed on the display panel 2C. The touch panel 100C has the same structure as the touch panel 100 described earlier in Embodiment 1.

The foldable display panel 2C, if repeatedly folded, will likely develop cracks, especially, in ends 25 of a hinge unit. Therefore, if the wires 6 connected to each electrode segment 5 extend in the frame area GA as in the comparative example, the cracks in the ends 25 of the hinge unit could undesirably damage the wires 6, which may affect the performance of the touch panel.

In contrast to this, in the touch panel 100C in accordance with Embodiment 4, the wires 6 connected to each electrode segment 5 extend in the display area DA, not in the frame area GA as in the comparative example. Therefore, even if cracks develop in the ends 25 of the hinge unit, the wires 6 will less likely be damaged than in the comparative example. The performance of the touch panel 100C is not affected. Hence, the robustness of the foldable display panel 2C can be improved.

The present disclosure is not limited to the description of the embodiments above and may be altered within the scope of the claims. Embodiments based on a proper combination of technical means disclosed in different embodiments are encompassed in the technical scope of the present disclosure. Furthermore, new technological features can be created by combining different technical means disclosed in the embodiments.

The invention claimed is:

1. A display device comprising:
   a display panel; and
   a touch panel on the display panel, the touch panel comprising:
      a plurality of detection electrodes extending in a first direction in a plan view; and
      a plurality of drive electrodes disposed respectively between the plurality of detection electrodes and extending in the first direction, each of the plurality of drive electrodes comprising:
         a plurality of electrode segments patterned in the first direction; and
         a plurality of wires connected respectively to one of the plurality of electrode segments and extending in the first direction,
   wherein
   the touch panel further comprises:
      a first electrode layer;
      a second electrode layer between the first electrode layer and the display panel; and
      an insulation layer between the first electrode layer and the second electrode layer,
   the plurality of detection electrodes and the plurality of electrode segments of the plurality of drive electrodes are provided in the first electrode layer,
   the plurality of wires of the plurality of drive electrodes are provided in the second electrode layer, and
   at least one of the plurality of wires overlaps, and is not connected to, another electrode segment being different from the one of the plurality of electrode segments in the first direction.

2. The display device according to claim 1, wherein the insulation layer in the touch panel has a contact hole through which the one of the plurality of electrode segments is connected to a corresponding one of the plurality of wires.

3. A display device comprising:
a display panel; and
a touch panel on the display panel, the touch panel comprising:
- a plurality of detection electrodes extending in a first direction in a plan view; and
- a plurality of drive electrodes disposed respectively between the plurality of detection electrodes and extending in the first direction, each of the plurality of drive electrodes comprising:
  - a plurality of electrode segments patterned in the first direction; and
  - a plurality of wires connected respectively to one of the plurality of electrode segments and extending in the first direction, wherein
the display panel comprises a plurality of pixel regions,
the plurality of detection electrodes and the plurality of drive electrodes in the touch panel are disposed along a light-blocking region located between the plurality of pixel regions, and
at least one of the plurality of wires overlaps, and is not connected to, another electrode segment being different from the one of the plurality of electrode segments in the first direction.

4. The display device according to claim 3, wherein
the light-blocking region is formed in a first lattice shape between the plurality of pixel regions,
the plurality of detection electrodes in the touch panel are formed in a second lattice shape including:
- a first extension portion extending in the first direction on the light-blocking region; and
- a second extension portion extending in a second direction that is perpendicular to the first direction, and the plurality of electrode segments is formed in stripes including:
- a plurality of segment extension portions provided at intervals in the first direction and extending in the second direction on the light-blocking region; and
- a plurality of connection portions extending in the first direction from both ends of one of those two of the plurality of segment extension portions that are adjacent to each other to connect the two adjacent segment extension portions.

5. The display device according to claim 1, wherein the touch panel further comprises, in the second electrode layer, a shield electrode extending along the plurality of wires.

* * * * *